United States Patent [19]
Brandsetter et al.

[11] Patent Number: 4,679,048
[45] Date of Patent: Jul. 7, 1987

[54] ADAPTIVE SPREAD SPECTRUM RADAR

[75] Inventors: Robert W. Brandsetter, Levittown; Jakob Schwarz, Flushing; Arnold Seidon, Syosset, all of N.Y.

[73] Assignee: Grumman Aerospace Corporation, Bethpage, N.Y.

[21] Appl. No.: 727,323

[22] Filed: Apr. 25, 1985

[51] Int. Cl.[4] .......................................... G01S 13/02
[52] U.S. Cl. .................................................. 342/61
[58] Field of Search ............... 343/12 R, 7 A, 7.5, 343/18 E, 17.7; 375/1, 22; 455/62, 63; 370/18, 19

[56] References Cited

U.S. PATENT DOCUMENTS

| | | | |
|---|---|---|---|
| 2,807,799 | 9/1957 | Rosenthal | 343/12 R |
| 2,856,600 | 10/1958 | Clevenger | 343/5 AF |
| 2,862,203 | 11/1958 | Skaraeus et al. | 343/18 E |
| 2,884,627 | 4/1959 | Ratcliffe | 343/5 AF |
| 2,943,315 | 6/1960 | Rosenthal | 343/12 R |
| 3,001,064 | 9/1961 | Alexis et al. | 455/63 |
| 3,160,813 | 12/1964 | Biggi et al. | 325/58 |
| 3,569,965 | 3/1971 | Bagley | 343/5 |
| 3,676,778 | 7/1972 | Mori | 324/4 |
| 3,896,382 | 7/1975 | Magenheim | 325/56 |
| 3,916,406 | 10/1975 | Miller et al. | 343/7 A |
| 3,932,745 | 1/1976 | Hartman | 343/17.7 |
| 4,042,922 | 8/1977 | Natter et al. | 343/5 W |
| 4,522,466 | 6/1985 | Lindig et al. | 364/82 |

FOREIGN PATENT DOCUMENTS

| | | | |
|---|---|---|---|
| 451344 | 9/1948 | Canada | 343/5 AF |
| 1529563 | 3/1957 | United Kingdom | 343/5 AF |

Primary Examiner—Thomas H. Tarcza
Assistant Examiner—Donald E. Hayes, Jr.
Attorney, Agent, or Firm—Pollock, VandeSande & Priddy

[57] ABSTRACT

An adaptive radar system is presented which is capable of identifying interference frequencies and changing the system operating frequencies to permit radar operation in portions of the frequency spectrum that are free of interference. A time-integrating optical receiver or electronic FFT is employed to detect those frequencies where interference occurs thereby cueing the radar system to noise-free portions of the frequency spectrum. A digital computer processes the information from the optical or electronic FFT receiver to control system operation at those frequencies where interference has not been detected.

8 Claims, 5 Drawing Figures

ADAPTIVE SPREAD SPECTRUM RADAR

FIELD OF THE INVENTION

The present invention relates to broadband (chirp) radar systems and more particularly to such a system capable of straddling detected interference frequencies.

BACKGROUND OF THE INVENTION

All spread spectrum radars are subject to adverse interference due to man-made sources. The prior art contains a wide variety of methods for operating chirp radars in an interference environment. However, experience has demonstrated that such methods decrease the operating performance of the radar system. Accordingly, it would be desirable to have available a radar system which can adapt to interference by coding its chirp frequencies to transmit and receive only in that portion of the spectrum where there is no interference. By so doing, a chirp radar system could operate at optimum performance levels.

BRIEF DESCRIPTION OF THE PRESENT INVENTION

The present invention relates to an adaptive radar system which is capable of identifying interference frequencies and changing the system operating frequencies to permit radar operation in portions of the frequency spectrum that are free of interference.

A time-integrating optical or electronic Fast Fourier Transform (FFT) receiver is employed to detect those frequencies where interference is present thereby cueing the radar system to interference-free portions of the frequency spectrum. A digital computer processes the information from the optical or FFT receiver to steer system operation to those frequencies where interference has not been detected.

In those environments where a large number of interference frequencies exist, the present invention is capable of straddling disjointed frequency bands where no interference exists to create synthesized frequency bands that are sufficient to allow operation as a normal chirp radar.

The present invention is capable of operating with a radar system equipped with a "dechirper" decoder which is controlled by the system computer.

As a result of the present invention, a broadband radar may be relied upon to adapt to interference by changing transmission frequencies to portions of the spectrum where interference does not exist. A radar equipped with the present invention is therefore capable of operating at full power and optimum performance.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE PRESENT INVENTION

Figure 1:
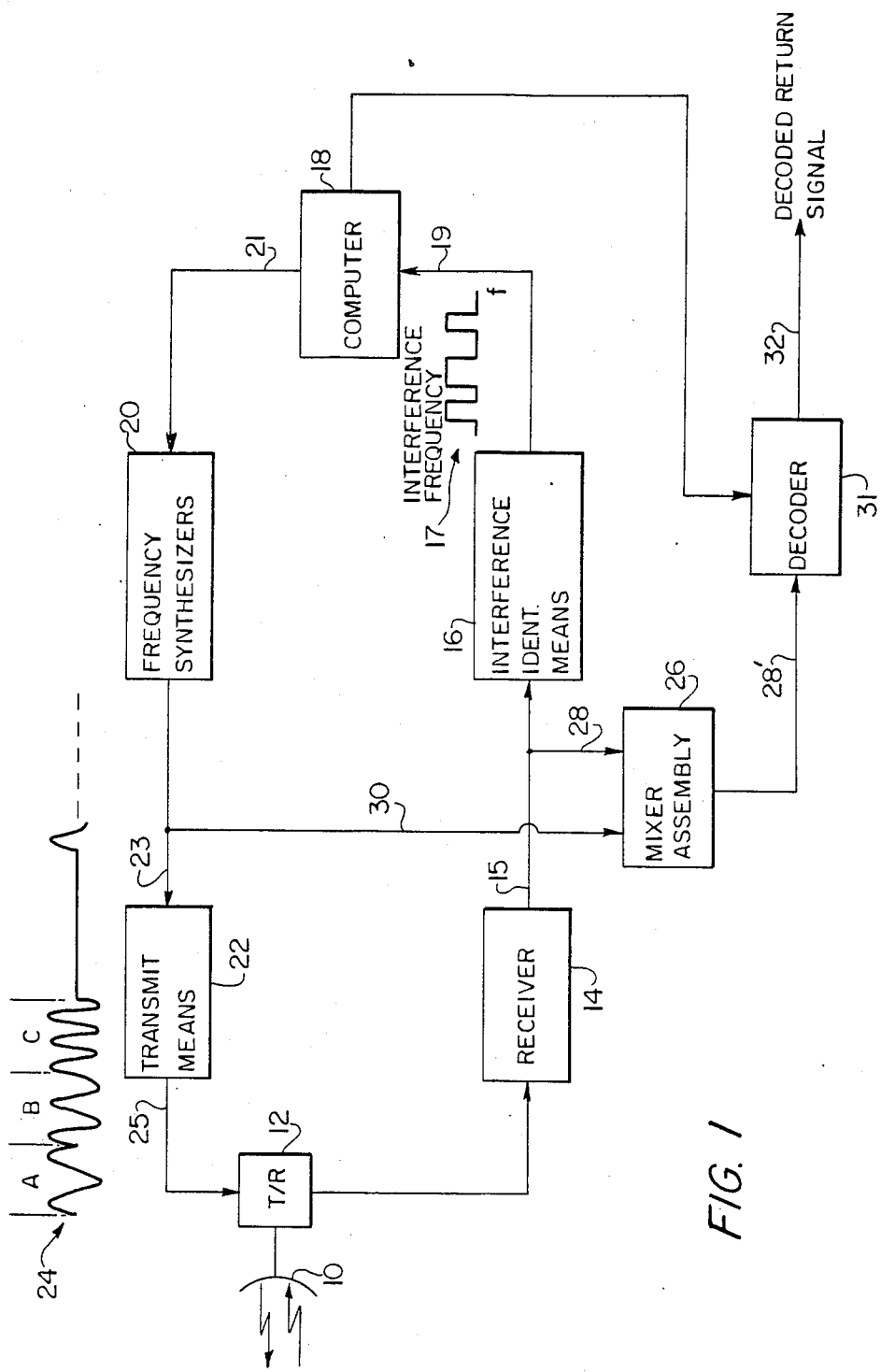
FIG. 1 is a basic block diagram of the present invention.

A basic block diagram of the present invention is illustrated in FIG. 1. During the time when the system is receiving, the transmit-receive antenna 10 picks up return signals and transfers them to the input of a conventional broadband radar receiver 14, via a transmit-receive switch 12. Wire 15 connects the output of receiver 14 to the input of an interference identification means 16 to be discussed in greater detail hereinafter in connection with FIG. 2. The output wire 19 from the interference identification means 16 transmits those frequency bands contributing unwanted interference, in the vicinity of radar operation, to a computer 18. An example of spaced interference frequency bands detected by the interference identification means is generally indicated by reference numeral 17. Computer 18 stores the detected interference frequencies so that system operation can be directed to open frequencies and avoid the detected interference frequencies. The computer assigns the number of non-interferring frequency bands which may be artifically juxtaposed so as to synthesize a single broadband frequency range sufficient to handle a transmitted signal. Control signals from the computer are connected, via wire 21, to the input of a series of interconnected frequency synthesizers, generally indicated by reference numeral 20. The synthesizers then generate the non-interferred frequencies, designated by computer 18, and apply them to the transmit means 22, via interconnecting wire 23. The structure of the transmit means is set forth in greater detail in connection with FIG. 3. However, the output wire 25 from transmit means 22 carries a transmit signal shown by reference numeral 24 which operates the transmitter at juxtaposed frequency segments existing at non-interferred frequencies assigned by computer 18. Transmit-receive switch 12 is switched to a transmit mode in order to permit transmission of the radar signal via antenna 10.

In the event the transmitted signal is coded by such conventional means as "chirping," it is necessary to "dechirp" the return signal. This is accomplished by providing a mixer assembly 26, to be discussed in greater detail in connection with FIG. 5, with the non-interferred synthesized frequencies which are connected to the mixer assembly 26 via interconnecting wire 30. The output from receiver 14 is also connected by interconnecting wire 28' to the mixer assembly 26 thereby providing decoder 31 with a received signal, via interconnecting wire 28'. The received signal itself is impressed upon the same juxtaposed frequency segments as was the transmitted signal. By providing those synthesized frequencies to mixer assembly 26, via interconnecting wire 30, the corresponding intermediate frequencies from the mixer assembly 26 may be added thereby permitting dechirping or decoding by conventionally designed decoder 31. The output wire 32 from decoder 31 therefore carries the decoded return signal.

Figure 2:
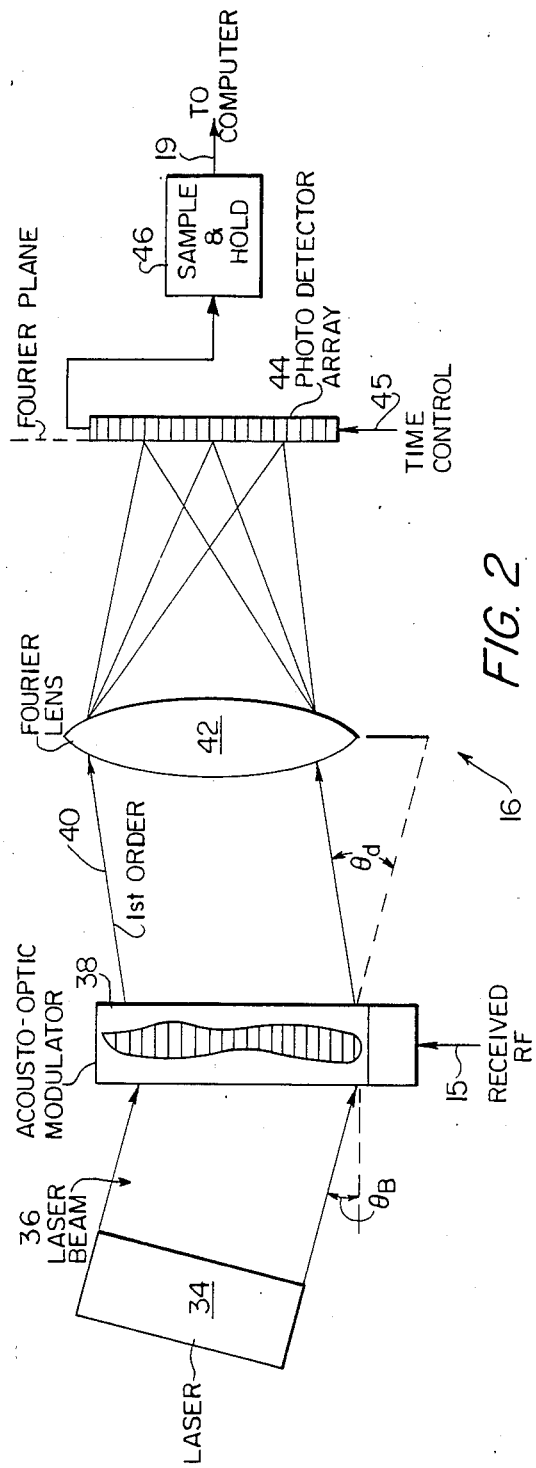
FIG. 2 is a schematic representation of an optical receiver employed in the present invention to detect interference frequencies.

FIG. 2 illustrates the acousto-optical structure which comprises the interference identification means 16. The structure of FIG. 2 permits continuous and instantaneous spectral analysis of received spectra and can provide timely data for directing a radar transmitter to interference-free sectors of the spectrum.

A laser 34 is provided for generating a beam 36 of coherent light to an acousto-optic modulator 38. Such a modulator may be of the type disclosed in co-pending patent application Ser. No. 498,462, filed May 26, 1983, by the present assignee. The laser beam impinges upon the modulator 38 at the indicated Brass Angle $\theta_\beta$. The received RF signal from receiver 14 is impressed upon the laser beam and a resulting first order beam 40 contains the received RF modulation and is deflected through the modulator 38 at the indicated angle $\theta_d$. The resulting beam then undergoes Fourier transformation by a Fourier lens 42 and the transformed image appears at the indicated Fourier plane as a spatial frequency distribution of the RF spectra. A conventional photodetector array 44 is positioned at this plane and each component of the spatial frequency distribution energizes a corresponding photodetector of the array. The individual photodetectors of the array are connected to a conventional sample-and-hold circuit 46 so that the frequency and amplitude of each spectral component can be stored and sent to the computer via output wire 19. Each cycle for the detection and storing is determined by a sufficient integration time as imposed upon the photodetector array 44 at the time control input 45.

Figure 3:
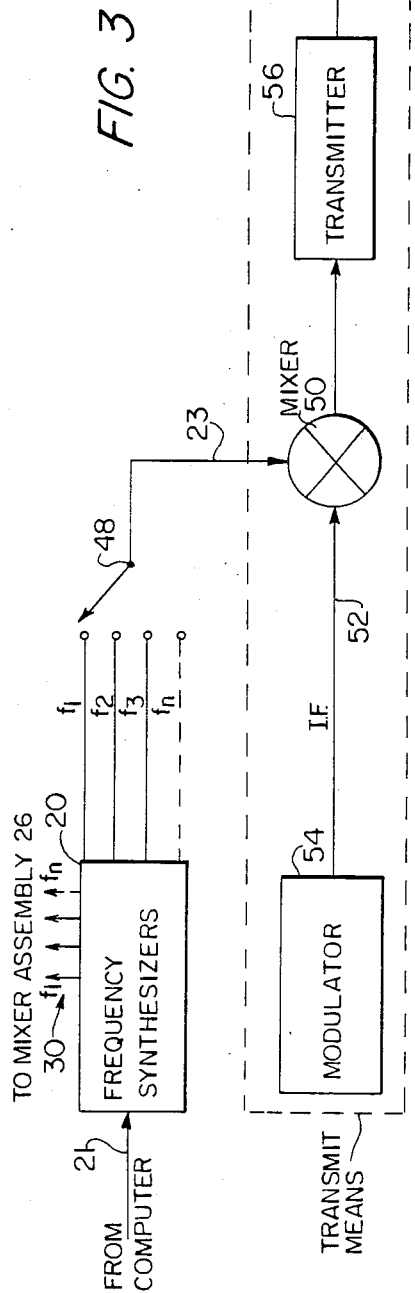
FIG. 3 is a more detailed block diagram illustrating the connection between a frequency synthesizer and a transmitting means.

The transmit means 22 is shown in FIG. 3 to include a modulator 54 of conventional design which modulates a transmitted signal with a coded or "chirp" signal in a well-known manner. The modulator 54 generates a coded transmit signal appearing at an intermediate frequency on line 52 where it is connected to a first input of mixer 50. The second input of the mixer is connected, via connecting wire 23 to a switch 48 which sequentially switches a number of non-interferred frequency components, for example $f_1-f_n$ to the second mixer input. As a result mixer 50 will mix the modulated IF signal from modulator 54 with the sequentially switched frequency components; and as a result, transmitter 56 will transmit a modulated signal comprised of the disjointed frequency components which have been juxtaposed in time as previously illustrated by reference numeral 24 in FIG. 1. The output from transmitter 56 is fed along wire 25 to the transmit-receive switch 12 (FIG. 1) for transmission.

The frequency components $f_1-f_n$ are generated by a bank of frequency synthesizers generally indicated by reference numeral 20 as a result of a driving signal from the computer on wire 21 which directs the frequency synthetizers to generate the various frequency components at those frequencies which have been analyzed by the computer 18 as being non-interferred. It should be noted that, although switch 48 is shown as a mechanical switch, in a preferred embodiment it would be a conventional solid state switch.

Figure 4:
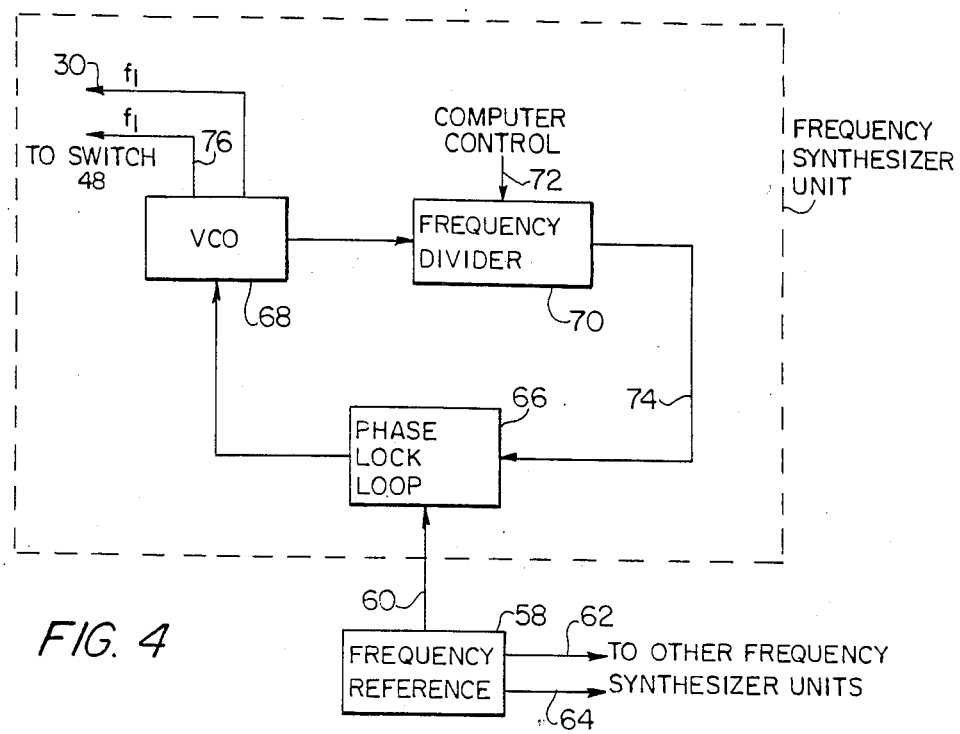
FIG. 4 is a block diagram of a single frequency synthesizer unit.

FIG. 4 illustrates in block diagram form the structure of a frequency synthesizer unit which is capable of generating one of the frequency components, such as $f_1$. It should be understood that in a normal operational system such as shown FIG. 1 a number of frequency synthesizer units would be included to handle the anticipated number of frequency components $f_1-f_n$ which would be necessary to avoid an anticipated maximum number of interferring frequencies. The frequency synthesizer unit of FIG. 4 is seen to include a conventional frequency divider 70 which is provided with an initial frequency input from computer 18 on wire 72. A single divided component from divider 70 is delivered, via wire 74, to a conventional phase-locked loop 66 which receives a second input, from wire 60, connected to a stable frequency reference 58. The frequency reference is also employed in other frequency synthetizer units by means of interconnecting wires, such as 62 and 64. The output from the phase-locked loop 66 is input to a voltage controlled oscillator 68 which produces two outputs along wires 30 and 76 for carrying stable signals at one particular frequency, such as the illustrative $f_1$ frequency. The frequency component from wire 76 is input to switch 48 shown in FIG. 3.

Figure 5:
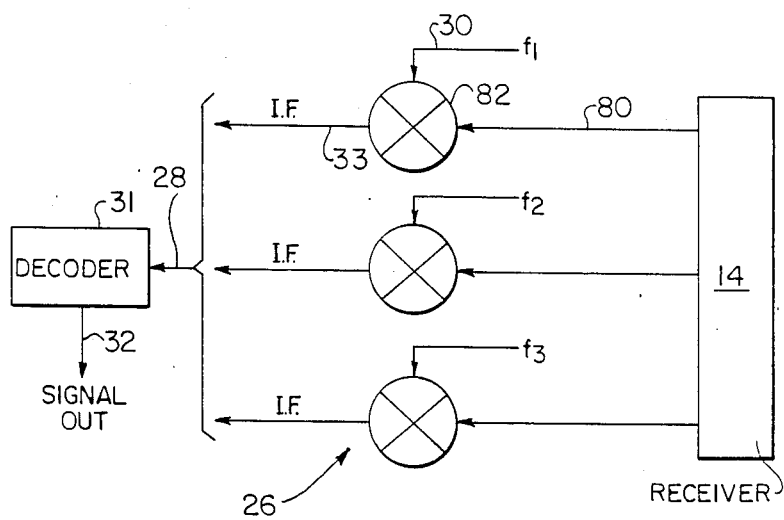
FIG. 5 is a block diagram of a mixer assembly as employed in the present invention.

The other output of the oscillator 68, along wire 30, is connected as a first input to mixer 82 of the mixer assembly illustrated in FIG. 5. The signal from receiver 14 appears along wire 80 to a second input of mixer 82 so that a resulting intermediate frequency appears along output wire 33 of mixer 82. Similar mixing occurs between the received signal from receiver 14 and each of the other frequency components $f_2-f_n$. The individually generated intermediate frequency signals are summed to permit "dechirping" by decoder 31 as previously mentioned in connection with FIG. 1. The output from decoder 31 is then connected to a signal processor as is the case with prior art radar systems.

In summary, the present radar system adapts to interference by changing transmission frequency to a series of frequency sectors in portions of the spectrum where interference does not exist. Since the transmitted signal and received signal both operate on the juxtaposition of the non-interferred frequency sectors, broadband radar operation may be realized without encountering adverse interference due to man-made sources.

It should be understood that the invention is not limited to the exact details of the construction shown and described herein for obvious modifications will occur to persons skilled in the art.

We claim:

1. An adaptive radar system capable of identifying interference frequencies and changing the system operating frequencies to permit radar operation in interference-free portions of the frequency spectrum, the system comprising:
   means for receiving a radar signal;
   means connected at its input to the receiving means output for identifying those frequencies where interference exists;
   computing means connected at its input to the identifying means output for determining and storing data relating to non-interference frequencies;
   synthesizer means driven by the computing means for generating synthesized signals at the non-interference frequencies; and
   means connected between the output of the frequency synthesizer and an antenna for generating a transmitted signal at an effective frequency band composed of juxtaposed frequency bands straddling identified interference bands synthesizing a single broad band frequency range sufficient to handle a transmitted signal.

2. The system set forth in claim 1 together with means for mixing the synthesized frequencies and signals from the receiving means for translating a return signal to the non-interferring frequencies.

3. An adaptive radar system capable of identifying interference frequencies and changing the system operating frequencies to permit radar operation in interference-free portions of the frequency spectrum, the system comprising:

means for receiving a radar signal;

means connected at its input to the receiving means output for identifying those frequencies where interference exists;

computing means connected at its input to the identifying means output for determining and storing data relating to non-interference frequencies;

synthesizer means driven by the computing means for generating synthesized signals at the non-interference frequencies; and means connected between the output of the frequency synthesizer and an antenna for generating a transmitted signal at an effective frequency band composed of frequency bands straddling identified interference bands;

wherein the identifying means is acousto-optic and includes:

a laser for producing a beam of light;

an acousto-optic modulator having a first surface for receiving the beam of light and further having an electrical input connected to the output of the receiving means for impressing the received radar signal onto the incident received beam of light thus resulting in a first order beam which possesses a narrow band phase modulation with spatial and temperal dependence;

a Fourier lens positioned at one focal length to the opposite surface of the modulator to generate a Fourier transform at the back focal plane;

a plurality of photodetectors positioned at the plane for translating the image to an electrical array; and means connected to the photodetectors for storing data corresponding to the translated image.

4. The system set forth in claim 2 together with decoding means connected to the output of the mixing means for dechirping a returned signal.

5. A method for adapting a radar system with the capability of identifying interference frequencies and changing the system operating frequencies to permit radar operation in interference-free portions of the frequency spectrum, the method comprising the steps:

receiving a radar signal;

acoustically modulating a laser beam with the received signal for optically identifying those frequencies where interference exists;

translating the optical identification to an electrical one;

computing those areas of a preselected frequency spectrum occupied by non-interfered frequencies;

generating synthesized non-interference frequencies; and generating a transmitted signal at an effective operating frequency band composed of non-interfered frequency bands straddling identified interference frequencies.

6. The method set forth in claim 5 together with the step of mixing the synthesized frequencies and the signals from the receiving means for translating a return signal to the non-interferring frequencies.

7. The method set forth in claim 5 wherein acoustically modulating the light beam comprises the steps:

producing a beam of light from a laser;

impinging the light beam on a first surface of an acousto-optical modulator;

modulating the light beam with a received RF signal;

positioning a Fourier lens adjacent the opposite surface of the modulator to generate a Fourier transform at the back focal plane;

positioning a photodetector array at the focal plane for translating the image to an electrical array; and storing data corresponding to the translated image.

8. The method set forth in claim 6 together with the step of decoding the translated signal for dechirping a returned signal.

* * * * *

UNITED STATES PATENT AND TRADEMARK OFFICE
CERTIFICATE OF CORRECTION

PATENT NO. : 4,679,048

DATED : July 7, 1987

INVENTOR(S) : Robert W. BRANDSTETTER, ET AL.

It is certified that error appears in the above-identified patent and that said Letters Patent is hereby corrected as shown below:

Column 3, line 8, change "Brass" to --Bragg--.

Column 3, line 60, after "shown" insert --in--.

Signed and Sealed this

Twenty-seventh Day of October, 1987

*Attest:*

DONALD J. QUIGG

*Attesting Officer*    *Commissioner of Patents and Trademarks*